United States Patent
Todori et al.

[11] Patent Number: 6,002,522
[45] Date of Patent: Dec. 14, 1999

[54] OPTICAL FUNCTIONAL ELEMENT COMPRISING PHOTONIC CRYSTAL

[75] Inventors: Kenji Todori; Toshiro Hiraoka; Shuji Hayase, all of Yokohama, Japan

[73] Assignee: Kabushiki Kaisha Toshiba, Kawasaki, Japan

[21] Appl. No.: 08/872,163

[22] Filed: Jun. 10, 1997

[30] Foreign Application Priority Data

Jun. 11, 1996 [JP] Japan ................................ 8-149311

[51] Int. Cl.$^6$ ...................................................... G02B 5/30
[52] U.S. Cl. ...................... 359/573; 359/576; 359/578; 385/37
[58] Field of Search .................... 359/573, 578, 359/240, 245, 566, 572, 576; 372/700; 385/37

[56] References Cited

U.S. PATENT DOCUMENTS

| | | | |
|---|---|---|---|
| 5,218,655 | 6/1993 | Mizrahi | 385/37 |
| 5,245,466 | 9/1993 | Burns et al. | 359/296 |
| 5,337,185 | 8/1994 | Meier et al. | 359/576 |
| 5,406,573 | 4/1995 | Ozbay et al. | 372/43 |
| 5,526,449 | 6/1996 | Meade et al. | 385/14 |
| 5,600,483 | 2/1997 | Fan et al. | 359/344 |
| 5,651,818 | 7/1997 | Milstein et al. | 117/54 |
| 5,684,817 | 11/1997 | Houdre et al. | 372/45 |
| 5,734,174 | 3/1998 | Horiguchi | 257/17 |
| 5,740,287 | 4/1998 | Scalora et al. | 385/6 |
| 5,751,466 | 5/1998 | Dowling et al. | 359/589 |
| 5,784,400 | 7/1998 | Joannopoulos et al. | 372/96 |

FOREIGN PATENT DOCUMENTS 7-94819   4/1995   Japan .

OTHER PUBLICATIONS

J.P. Dowlilng, et al., "Anomalous Index of Refraction in Photonic Bandgap Materials", J. Modern Optics, vol. 41, No. 2, pp. 345–351 Jan. 1994.

J.N. Winn, et al., "Two–Dimensional Photonic Band–Gap Materials", J. Modern Optics, vol. 41, No. 2, pp. 257–273 Jan. 1994.

H.S. Sözüer, "Photonic Band Claculations for Woodpile Structures", J. Modern Optics, vol. 41, No. 2, pp. 231–239 Jan. 1994.

*Primary Examiner*—Cassandra Spyrou
*Assistant Examiner*—John Juba, Jr.
*Attorney, Agent, or Firm*—Oblon, Spivak, McClelland, Maier & Neustadt, P.C.

[57] ABSTRACT

An optical functional element including two diffraction gratings having metal films formed on their surfaces, which are arranged to oppose each other to form a photonic band, and an optical functional film interposed between these diffraction gratings, the optical functional film consisting of a polymer containing an optical functional material, such as a nonlinear optical material and electro-optic material, dispersed in the polymer.

20 Claims, 7 Drawing Sheets

OPTICAL FUNCTIONAL ELEMENT COMPRISING PHOTONIC CRYSTAL

BACKGROUND OF THE INVENTION

The present invention relates to an optical functional element which can be used as an optical delay element, wavelength converter, optical switch, optical modulator, optical amplifier, optical memory, dispersion compensator, soliton generator, and the like.

In optical communications and optical circuits, improvements of various optical functional elements have been demanded. For example, optical communications require an optical switching that has an optical delay element to set a communication route. Since the optical switching cannot simultaneously process a plurality of optical signals, the optical delay element delays some of the optical signals to sequentially input them to the optical exchange or to process them by changing the order of the signals. Conventionally, as an optical delay element, an optical fiber which has a length corresponding to a required delay time and is arranged in addition to the optical fibers used as signal lines is used, and the optical signal to be delayed is input to and output from this optical fiber via optical switches. However, the optical fiber used as the optical delay element must have a length of several ten meters, and a large space is required to accommodate the optical fiber.

In a wavelength converter (second harmonic generation, SHG) that uses the second-order nonlinear optical effect, it is important to realize phase matching between the fundamental wave and second harmonic wave (SH wave) in terms of the wavelength conversion efficiency. However, the refractive index of a substance depends on the wavelength of light, and it is hard to realize phase matching. As a conventional method of realizing phase matching, an angle tuning method that utilizes birefringence of a single crystal, Cerenkov-radiation type phase matching and quasi-phase matching are known. In consideration of the conversion efficiency, the method using the single crystal is advantageous. However, it is difficult to grow a large single crystal. Also, although angle tuning is realized in bulk, since in a waveguide the crystal orientation cannot be finely adjusted three-dimensionally, it is hard to realize angle tuning. Cerenkov radiation assumes strict angle of phase matching between the SH and fundamental waves and it can provide only a low conversion efficiency. In quasi-phase matching, it is difficult to manufacture a complicated element structure. Also, since quasi-phase matching is attained by adding an offset to the shifted phase, phase matching is not achieved in the strict sense.

Due to these problems, it is difficult to put the wavelength converter into practical applications although various applications such as a light source of an optical disk are expected. In particular, an organic nonlinear optical material is advantageous as compared to an inorganic material since it has a very large nonlinear susceptibility, but has not reached the stage of practical use due to problems in the manufacturing process of elements. Also, when a polymeric second-order nonlinear material or a material prepared by dispersing an organic nonlinear optical material in a polymer is used, an orientation treatment by means of poling is required, and a measure against orientation relaxation must also be taken.

In an element such as an optical switch that uses the third-order nonlinear optical properties, the nonlinear susceptibility is known to be larger as the phase relaxation time becomes longer. For this reason, the nonlinear susceptibility becomes large in the resonance region of absorption, and becomes small in the nonresonance region. However, since signal light is absorbed in the resonance region, the intensity of the switched light decreases, or decomposition of the functional material occurs due to heat generated by absorption. In consideration of this fact, the third-order nonlinear optical element that operates in the resonance region is not preferred in practical applications. In view of such problems, elements that operate in the non-resonance region have been demanded. However, since such elements have a small nonlinear susceptibility, as described above, they have not reached the level of practical use yet.

As the methods of optical modulation, electro-optic modulation (EO modulation) using the Pockels effect, absorption modulation that attains modulations based on an absorption change by applying an electric field and direct modulation that controls the injection current of a semiconductor laser are known. The direct modulation does not require any special modulator and requires only a small total number of parts. However, it is hard to achieve high-speed modulation, and the half width of wavelength undesirably broadens. In view of such drawback, high-speed external modulators using materials such as GaAlAs and, $LiNB_3$ have been developed, but satisfactorily high performance has not been obtained to date. For this reason, a modulator which can be easily manufactured, allows high-speed modulation, and has a high ON-OFF ratio, has been demanded.

BRIEF SUMMARY OF THE INVENTION

It is an object of the present invention to provide an optical functional element which can delay an optical signal and can be set within a small space, and an optical functional element which can effectively provide functions of various optical functional materials by utilizing delay of an optical signal or control of a refractive index.

An optical functional element of the present invention has a structure in which materials having different refractive indices are periodically arranged to form a photonic band, and the wavelength of light corresponding to the photonic band edge is set in the vicinity of the wavelength of light to be transmitted.

Another optical functional element of the present invention has a diffraction grating for forming a photonic band, and an optical functional film formed on the surface of the diffraction grating.

Still another optical functional element of the present invention has a diffraction grating for forming a photonic band, and a metal film, optical functional film and metal film, which are formed in the order on the surface of the diffraction grating.

The optical functional element of the present invention may have a structure in which two diffraction gratings having metal films formed thereon that are arranged to oppose each other and form photonic bands, and an optical functional film is interposed between the two diffraction gratings.

Additional objects and advantages of the invention will be set forth in the description which follows, and in part will be obvious from the description, or may be learned by practice of the invention. The objects and advantages of the invention may be realised and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention will be described in detail hereinafter.

First, a photonic band will be explained below. Note that the photonic band can be easily understood by analogy with the energy band (conduction band) of semiconductors. In a semiconductor crystal, since electron waves are Bragg-reflected by atoms which are arranged periodically, the dispersion relationship between energy E and wavenumber k, i.e., a band, is generated. This band generation is traced to the wavelength of electron waves being in the neighborhood of the lattice constant of the semiconductor crystal. As can be easily analogized, such phenomenon can occur not only for electron waves but also for every wave. The photonic band means a band in the wavelength region of light.

The photonic band is formed by periodically arranging two or more different substances having different refractive indices, and a medium that forms the photonic band is called a photonic crystal. Light is Bragg-reflected by a medium having periodicity of refractive index, and forms a band like in electron waves. Under a certain condition, a region where no light can exist is observed like an energy gap of a semiconductor. Such region is called a photonic band gap. In the photonic crystal, specific transmission spectrum, absorption spectrum, and reflection spectrum are observed. These spectra change depending on the arrangement of the substances constituting the photonic crystal and upon changes in refractive index of these substances.

An optical functional element of the present invention has a structure in which materials having different refractive indices (or dielectric constants) are periodically arranged to form a photonic band, and the wavelength of light corresponding to the photonic band edge is set in the vicinity of the wavelength of light to be transmitted.

The wavenumber k of light transmitting through the optical functional element having such structure depends on the periods and refractive indices of two materials. If a simple one-dimensional structure is assumed, k is expressed by the following equation:

$$k(\omega) = \frac{1}{d}\arccos\left[\cos\left(\frac{n_1\omega a}{c}\right)\cos\left(\frac{n_2\omega b}{c}\right) - \frac{n_1^2 + n_2^2}{2n_1 n_2}\sin\left(\frac{n_1\omega a}{c}\right)\sin\left(\frac{n_2\omega b}{c}\right)\right]$$

where $n_1$ and $n_2$ are respectively the refractive indices of first and second materials, a and b are respectively the thicknesses of the first and second materials, d is the period (d=a+b), $\omega$ is the angular frequency, and c is the optical velocity in vacuum (J. P. Dowling and C. M. Bowden, J. Mod. Opt. 41 (1994) 345).

Figure 1:
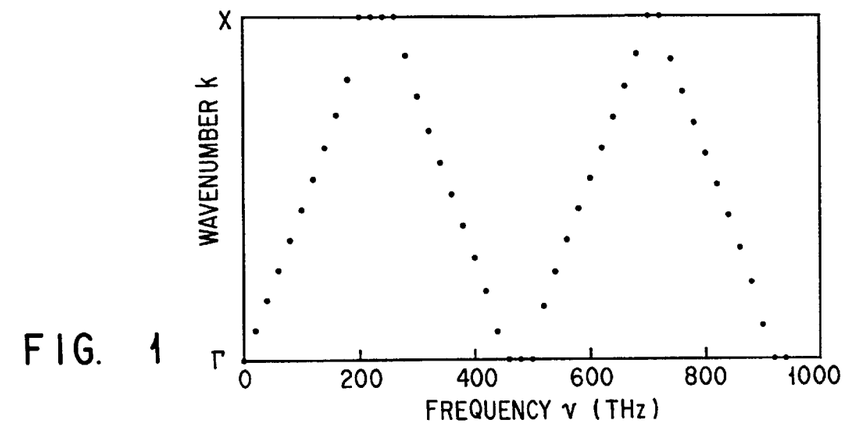
FIG. 1 is a graph showing the relationship between the frequency of light transmitting through a photonic band structure and the wavenumber of a wave packet.
Figure 2:
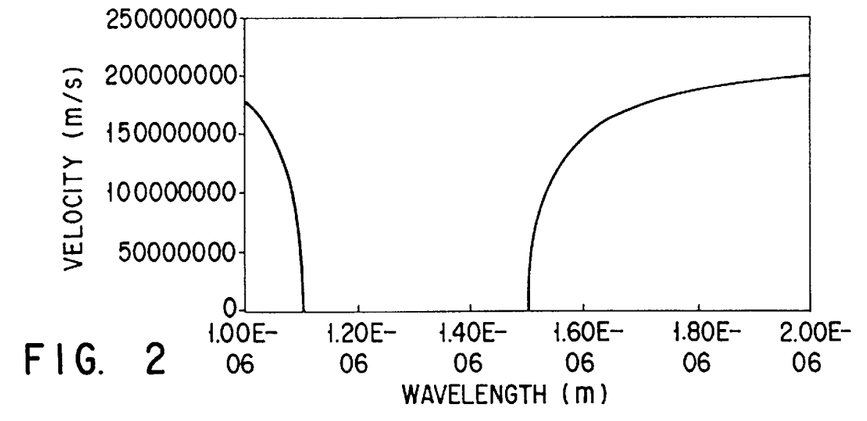
FIG. 2 is a graph showing the relationship between the wavelength of light transmitting through the photonic band structure and the group velocity of light.

FIG. 1 shows the relationship between the frequency $\nu$ and the wavenumber k when $n_1=1$, $n_2=1.7$, $a=b=2.35\times10^{-7}$ m, and $d=4.7\times10^{-7}$ m based on the above equation. On the other hand, since the group velocity (the propagation velocity of wave packet energy of light pulses) is given by the differential of $\omega(k)$, i.e., $d\omega(k)/dk$, the relationship between the wavelength and the group velocity of light is as shown in FIG. 2. The regions where no curves are present in FIGS. 1 and 2 correspond to the photonic band gap, and light in this wavelength region is not transmitted but reflected.

This phenomenon will be qualitatively described below. Since k and $\omega$ are proportional to each other in vacuum, the k–$\omega$ relation is linear in a k-space (to be referred to as a phase space). However, if regular periodicity of refractive index is given to this space, the k–$\omega$ relation folds back at a certain value of k and forms a zigzag pattern. At this time, at the fold-back point (first Brillouin zone edge), no value k exists for $\omega$, and this region becomes a band gap. For this reason, in consideration of, especially, one-dimensional periodicity, the energy value takes a minimum and maximum in that branch of the band at a point of k=0 or a point corresponding to minimum k and at a point corresponding to maximum k. At this band edge, the group velocity normally decreases.

In FIG. 1, frequency dependency of the refractive index in a band before it is folded is considered to be similar to the normal frequency dependency of the refractive index. The refractive index in a band after it is folded, however, varies between 0 to 1 with change in frequency of light. Thus, the refractive index can be controlled if the band structure is controlled. Such refractive index change is peculiar to the photonic band.

Figure 3:
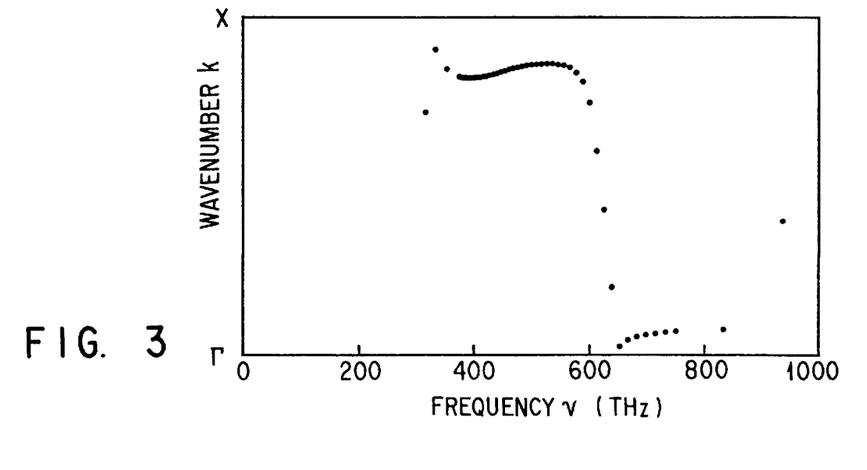
FIG. 3 is a graph showing the relationship between the frequency of light transmitting through a photonic band structure comprising metal and the wavenumber of a wave packet.

An optical functional element manufactured by using a metal such as aluminum shows a complicated band structure, because aluminum represents dispersion of refractive index as well as it has imaginary part of refractive index. FIG. 3 shows the relationship between the frequency ν and the wavenumber k with respect to an optical functional element consisting of periodically arranged aluminum and air, where a $=2.35\times10^{-8}$ m, b$=4.465\times10^{-7}$ m, and d$=4.7\times10^{-7}$ m. As shown in FIG. 3, a clear band gap is not observed. However, in this case as well, the group velocity decreases at the point corresponding to minimum k and the point corresponding to maximum k.

The present invention is achieved paying attention to the phenomenon in that the group velocity $d\omega(k)/dk$ decreases and approaches 0 in the vicinity of the photonic band edge, as described above. The optical functional element of the present invention sets the wavelength of light corresponding to the photonic band edge in the vicinity of the light to be transmitted, using the above-mentioned phenomenon, thereby providing a delay effect of light pulses. This element can be used not only as an optical delay element in optical communications but also as an element for optically multiplexing a plurality of light pulses while adjusting their group velocities. In addition, as compared to the conventional optical delay element consisting of an optical fiber, the space required for setting the optical functional element of the present invention can be small.

In order to form a photonic band structure in which materials having different refractive indices (or dielectric constants) are periodically arranged, two different materials may be arranged in a facecentered cubic structure or body-centered cubic structure. Conventionally, as typical examples of photonic crystal, a photonic crystal for the micro wave region, which is prepared by regularly forming holes in a dielectric using a drill (E. Yablonovitch, T. J. Gmitter, and K. M. Leung, Phys. Rev. Lett. 67, 2295 (1991)), and a photonic crystal for the infrared region, which is prepared by processing a bundle of glass fibers (K. Inoue, M. Wada, K. Sakoda, A. Yamanaka, M. Hayashi, and J. W. Haus, Jpn. J. Appl. Phys., 33, L1563 (1994)) are known. However, it is hard to realize a three-dimensional arrangement at a period as short as the wavelength of visible light. Hence, upon forming the photonic band structure, it is more practical to arrange two different materials one-dimensionally.

As a medium that can form a photonic band structure by a one-dimensional arrangement, a dielectric multilayered film used in a band-pass filter may be used. The dielectric multilayered film band-pass filter uses an anti-reflection film and a dielectric multilayered film mirror. The anti-reflection film cancels light reflected by a substrate by reflecting light, the phase of which is shifted by π with respect to light reflected by the substrate. The dielectric multilayered film mirror has a principle opposite to that of the anti-reflection film. The dielectric multilayered film band-pass filter reflects light of a specific wavelength by applying these principles. However, if the periodicity of refractive index is disturbed in the space domain of a wave packet, no photonic band is formed. For this reason, an optical path length of at least about 100 μm is required. Also, even phases at distant portions in a wave packet must correspond with each other. In view of these requirements, it is difficult to form a photonic band structure using a dielectric multilayered film.

In the present invention, an optical functional element having a structure in which materials such as a resist and air having different refractive indices are periodically arranged can be easily manufactured by forming a line pattern at a predetermined pitch by exposing and developing the resist. In particular, a method of directly exposing the resist by utilizing interference light upon irradiating laser beams from two directions can form a pattern excellent in long periodicity. In this case, the resist pattern may be used as a waveguide, or another material having a different refractive index may be buried in the spaces of the resist pattern and the obtained pattern may be used as a waveguide.

In the present invention, a structure in which materials having different refractive indices are periodically arranged may be formed in the core of an optical fiber by a method of irradiating and exposing an excimer laser beam having an oscillation wavelength of 248 nm or 193 nm to the core of the optical fiber via a phase mask. This method is effective since zero-order light can be suppressed (K. O. Hill, OPTRONICS, 14 (1995) 135).

In the present invention, a structure in which materials having different dielectric constants are periodically arranged may be formed by ion-implanting $Ti^+$ or $K^+$ while applying an electric field to a medium or implanting ions by bringing a solution into contact with the medium and applying an electric field, after the mask is formed on the medium.

In the present invention, as a medium having a structure in which materials having different dielectric constants are periodically arranged, a diffraction grating or a block copolymer having a regular phase separation structure may be used, as will be described later.

In the present invention, the period of two different materials having different refractive indices (i.e., the thickness of a pair of two different materials) is preferably equal to or smaller than 10 μm, and is preferably determined in consideration of the wavelength of light used. For example, in consideration of a wavelength of 1.55 μm for optical communications, the period interval is set at nearly half this wavelength. In the present invention, setting the wavelength of light corresponding to the photonic band edge in the vicinity of the wavelength of the light to be transmitted means that the wavelength of the light to be transmitted falls within the range of at least ±15% with respect to the wavelength of the photonic band edge.

In the present invention, in order to extract an arbitrary optical signal from a plurality of optical signals which are input to a waveguide type or optical fiber type optical functional element having a photonic band structure, a method of extracting evanescent waves leaking from the optical functional element using a near-field scanning optical microscope may be used.

If the periodicity of the arrangement of the two different materials is disturbed, the optical functional element of the present invention has no light delay since a photonic band cannot be formed. As such means, an ultrasonic generator or temperature regulator is used. Since the ultrasonic generator or temperature regulator moves the lattice point of the two different materials, it is the most suitable means for destroying the photonic band. When ultrasonic waves are used, the frequency at which one or more waves, i.e., several waves, of ultrasonic waves are formed in the spatial domain of the light pulse to be delayed. If standing waves of ultrasonic waves are formed using two ultrasonic oscillators or ultrasonic resonators, a one-dimensional photonic band structure can be formed by them.

The optical functional element (optical delay element) of the present invention can also be applied to a memory. More specifically, when an optical signal is injected into the optical delay element which is being irradiated with ultrasonic waves and then irradiation of ultrasonic waves is stopped, since the optical signal propagates slowly, the optical delay element temporarily serves as a memory. At this time, if light in the wavelength region, which is not transmitted through the optical delay element while ultrasonic irradiation is OFF, is injected while ultrasonic irradiation is ON, the optical signal stops in the optical delay element in the OFF state of ultrasonic irradiation. In order to output this optical signal, ultrasonic waves are irradiated again or the method of extracting evanescent waves can be used.

In the optical delay element of the present invention, when the frequency (wavelength) spreads due to the dispersion effect, dispersion may be corrected using a pair of gratings or prisms, but it is effective to combine two optical delay elements which compensate for each others' dispersion states.

Another optical functional element of the present invention will be described below. As described above, in the photonic band structure, the group velocity of transmitted light decreases in the vicinity of the band edge. Hence, if the photonic band structure and an optical functional material can be combined, the interaction between the light of a small group velocity and electrons in the optical functional material becomes strong, and it is advantageous to exhibit the function of the optical functional material. However, the conventional photonic band structure such as a dielectric multilayered film is hard to combine with an optical functional material to build an element. In contrast to this, the present invention provides an optical functional element which can effectively exhibit the function of the optical functional material using a diffraction grating which can form a photonic band and has a space that can hold the optical functional material.

The present invention can use materials having various functions such as a second- or third-order nonlinear optical material, a light-emitting material, an optical amplification material, an electro-optic material, and the like as optical functional materials. These optical functional materials may be dispersed in a polymer when they are used.

If a diffraction grating is used, the photonic band structure can be easily controlled by controlling the number of grating grooves per millimeter. As the diffraction grating used in the present invention, a holographic diffraction grating which is fabricated using light interference and has accurate groove spacings can be used. The holographic diffraction grating is formed as follows. That is, a resist is applied onto a substrate, and a laser beam is split into two light beams. The two light beams are irradiated onto the resist from two directions to expose interference fringes, and thereafter, the resist is developed. The holographic diffraction grating has grating grooves having sinusoidal sections corresponding to the intensity distribution of the interference fringes.

In the optical functional element of the present invention, since the period spacing, i.e., the grating spacing suffices to be 10 $\mu$m or less, the number of grating grooves per millimeter of the diffraction grating suffices to be 100 or more. Note that the grating spacing is preferably set to be about half the wavelength of the light to be used. For example, a holographic diffraction grating having 3,600 grating grooves per millimeter is commercially available. If that grating is used, a value twice the grating spacing is about 556 nm, and a photonic band in the visible region can be formed. Note that the band edge need not always use the lowest energy (i.e., the longest wavelength), but may use high energy. In this case, the number of grating grooves per millimeter can be smaller.

In the present invention, optical functional elements with various structures can be manufactured by appropriately setting the diffraction grating and the optical functional material. For example, the surface of the diffraction grating may be spin-coated with an optical functional material to form an optical functional film along the grating grooves. A metal film may be deposited on the surface of the diffraction grating, an optical functional film may be formed on the metal film by spin-coating, and another metal film may be formed thereon. The optical functional element of the present invention may have a structure in which two diffraction gratings having metal films formed thereon are arranged to oppose each other and an optical functional film is interposed between these diffraction gratings. A set of diffraction grating having a metal film formed thereon and a flat metal body may be used instead of the two diffraction gratings in the optical functional element having abovementioned structure. With these structures, photonic bands can be formed, and the optical functional material can be easily set. In particular, an element formed with a metal film has good diffraction efficiency, and can easily form a photonic band.

In the element including the two opposing diffraction gratings of the present invention, the relative positional relationship between adjacent crests is not particularly limited. This element exhibits polarization anisotropy. In such element, the metal films to be formed on the two diffraction gratings may consist of different materials to change the refractive index, thereby changing the photonic band structure.

Note that in the element including the two opposing diffraction gratings, the distance between the two diffraction gratings is set below 1/50 the optical path length (element length), and more specifically, below 5 mm. When the two opposing diffraction gratings are used as an optical delay element, light delay can be ON/OFF-controlled by changing the distance between the two diffraction gratings. More specifically, these diffraction gratings serve as an optical memory which can hold an optical signal input to the element by the delay time, and can be turned on/off. Also, the wavelength dispersion of the group velocity of light can be controlled to some extent by controlling the grating density of each diffraction grating. For example, the velocity of light having a long wavelength is controlled to be lower than that having a short wavelength to realize anomalous dispersion.

Optical function elements using diffraction gratings and various optical functional materials will be individually described below.

In the present invention, if a second-order nonlinear optical material is used, a wavelength converter can be manufactured. Decreasing the propagation velocity of light in the nonlinear optical material constituting the wavelength converter is equivalent to increasing the phase relaxation time. For this reason, even in the non-resonance region, the oscillation time of a single excited dipole moment is prolonged. Hence, the second-order nonlinear susceptibility becomes large, and so does the wavelength conversion efficiency. In addition, no absorption occurs in the non-resonace region, and this feature is convenient for the element material. In this element, since the refractive index can be controlled without changing the inherent properties of the second-order nonlinear material, phase matching can be attained by adjusting the light velocities of the fundamental wave and second harmonic. In particular, in a wavelength converter with a structure in which metal films are formed on both surfaces of the thin film of the nonlinear optical material, an electric field can be applied using these metal films as electrodes, thus allowing easily poling. After the permanent dipole moments of organic molecules in a polymer are oriented in the direction of the electric field by poling, if the electric field is kept applied, the orientation can be maintained, thus preventing orientation relaxation.

Figure 4:
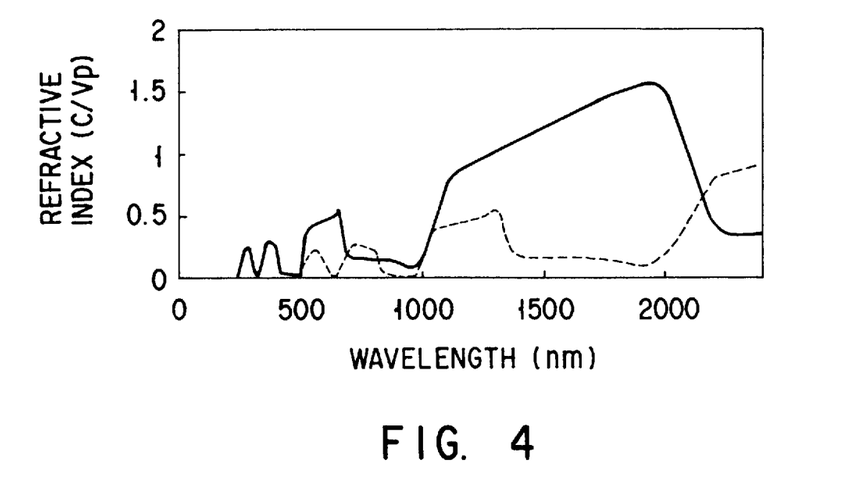
FIG. 4 is a graph showing the relationship between the wavelengths and refractive indices of the fundamental and second harmonic waves.

A calculation example that demonstrates that phase matching can be realized in the wavelength converter with the above-mentioned structure will be explained below. More specifically, FIG. 4 shows the calculation result of the wavelength dependence of the refractive index in a wavelength converter which uses a holographic diffraction grating having 1,800 grating grooves per millimeter and a third-order nonlinear optical material having a refractive index of about 1.8. Note that used is polarized light in which the direction of the electric field vector is perpendicular to the grating grooves. The broken curve in FIG. 4 represents the refractive index corresponding to light having a wavelength twice the numeric value on the abscissa. In FIG. 4, the phase velocities match at the intersection of the solid and broken curves, thus realizing phase matching.

Furthermore, a soliton generator can be manufactured by interposing a third-order nonlinear optical material between two diffraction gratings controlled so as to represent anomalous dispersion.

In the present invention, if a third-order nonlinear optical material is used, an optical switch can be manufactured. In this case as well, decreasing the propagation velocity of an optical signal amounts to prolonging the phase relaxation time, and the nonlinear susceptibility becomes large. In general, when the phase relaxation time is long and the nonlinear susceptibility is large like in the resonance region, the switching velocity and response velocity decrease. In contrast to this, in the optical switch of the present invention, since the velocity of light increases when the optical signal is output, the bit rate of signal processing does not lower even when the nonlinear optical susceptibility becomes large.

In an optical functional element with a photonic band gap of the present invention, which uses a light-emitting material as an optical functional material, even when the light-emitting material has a broad light-emitting wavelength band, light emission can be controlled in a wavelength selection manner. For this reason, not a simple band-pass filter but a light-emitting element that can concentrate energy at a specific wavelength can be formed.

In the present invention, if a material having the Pockels effect (first-order electro-optic effect) or Kerr effect (second-order electro-optic effect), or a material such as a liquid crystal that changes its orientation is used, an optical modulator can be manufactured. In this case, the metal films that coated onto the surface of the diffraction gratings to improve diffraction efficiency is used as electrodes. An electric field is applied to the material having the Pockels effect or Kerr effect via the metal films to change the refractive index of the material, thereby changing the photonic band. By controlling the electric field, modulation is attained so that the wavelength of the light to be transmitted falls within and outside the range of the photonic band gap. More specifically, if the wavelength of the light to be transmitted falls within the range of the photonic band gap, light cannot enter the element; otherwise, light can enter the element. If the photonic band gap is formed after light enters the element, the light stays within the element.

Figure 5:
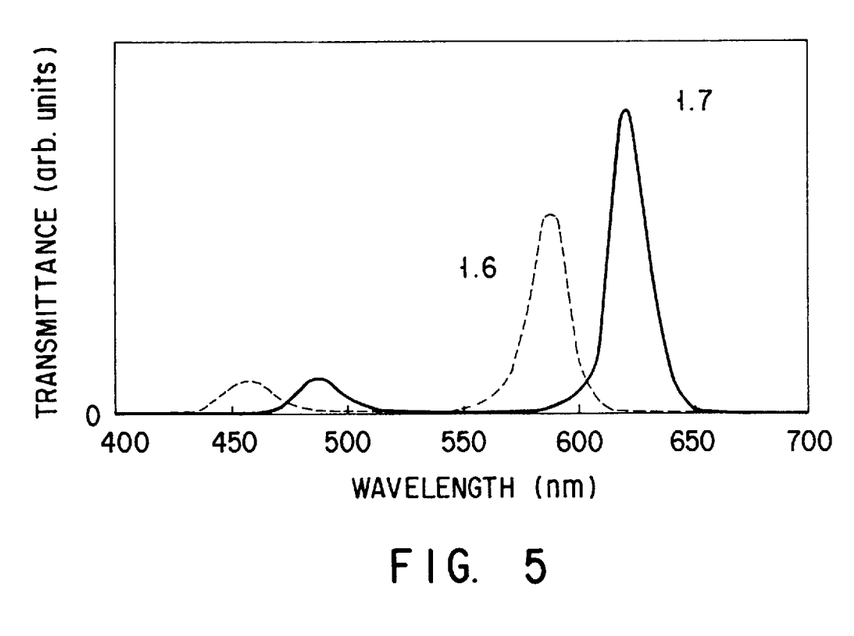
FIG. 5 is a graph showing the relationship between the wavelength and transmittance upon a change in refractive index of a material in an optical modulator.

FIG. 5 shows changes in transmittance when the refractive index is changed from 1.6 to 1.7 by 0.1 in an optical modulator using a material that exhibits the Pockels effect. As can be seen from FIG. 5, light having a wavelength of about 625 nm can be turned on/off. This modulation method does not require two polarization plates unlike in a conventional EO modulator as long as polarizing direction of transmitting light is properly determined.

When the group velocity is decreased using a photonic band element and optical modulation is done in that state, since the modulated light signal picked up from such elements resumes its original light velocity, a higher modulation speed can be realized. More specifically, optical modulation can be attained at a higher speed beyond the performance of the material used for modulation. This technique can also be applied to conventional modulators.

On the other hand, in an optical modulator using a material that exhibits the Kerr effect, the photonic band can also be controlled by turning on/off light irradiation in place of the electric field. In such element, the surface of the diffraction grating need not be coated with a metal film.

In the present invention, if other materials such as an optical amplification material are used as an optical functional material, the interaction between light and electrons in the entire system is strengthened as a result of a low light velocity, thus forming an efficient optical functional element such as an optical amplifier.

The optical functional element of the present invention can also be applied to an element for correcting deformation of signal pulses in an optical fiber in optical communications, i.e., a so-called dispersion compensator. Since the optical functional element of the present invention can realize negative dispersion of group velocity, it can also be used as a soliton generator when a nonlinear optical material is used together.

The optical functional element of the present invention is a kind of waveguide, and if the distance between two diffraction gratings is defined so that the guided mode of light to be used becomes a single mode, the functional of an optical functional material can be further improved. In the optical functional element of the present invention, to improve the function of the optical functional material it is also effective to prevent emission of guided light in directions other than the guided direction due to light scattering by coating two surfaces parallel to the guided direction of light with dielectric multilayered films or metal films. Such structure is also advantageous for coupling with optical fibers and the like.

In the present invention, a block copolymer having a regular phase separation structure may be used as a medium having a structure in which materials having different refractive indices are periodically arranged. As is generally known, some block copolymers form regular phase separation structures, and the separated phases are regularly arranged (E. L. Thomas, D. B. Alward, D. J. Kinning, and D. C. Martin, Macromolecules 19,2197 (1986); H. Hasegawa, H. Tanaka, K. Yamasaki, and T. Hashimoto, Macromolecules 20, 1651 (1987)). Such copolymers are dissolved in a solvent such as toluene to form a thin film by casting or spin-coating, thus exhibiting a microscopic phase separation structure by the self forming force. The microscopic phase separation structure is also called a sea-island structure, lamella structure, cylinder structure, bicontinuous structure, and the like. Since two different phases having different refractive indices are regularly arranged in such thin film of the block copolymer, the thin film can serve as a photonic crystal. Such photonic crystal is easy to manufacture, and the manufacturing cost can be reduced.

In a photonic crystal using a block copolymer, the refractive index can be controlled by changing the side chains of two different polymers. Also, the refractive index may be controlled by selectively impregnating one polymer chain with a complex such as an osmium complex. If the polymers that form the copolymer have photosensitivity, a waveguide can be formed after the photonic crystal is formed. When the waveguide can be formed, the optical functional element can be used as a dispersion compensator in the optical communication field.

When a substance that disturbs the periodicity of refractive index is mixed as impurity in the photonic crystal using a block copolymer, a region in which light of a specific wavelength region transmits can be formed in a photonic band gap. Such region corresponds to an impurity level in semiconductor. In this case, if a laser dye is introduced in side chains of the block copolymer or a laser dye having a selective affinity to one of the polymer chains is mixed and the oscillation wavelength of the laser dye and the impurity level are controlled so as to match with each other, a photonic crystal laser can be manufactured. Such photonic crystal laser cannot emit light within a band gap wavelength region except the impurity level, so that its oscillation loss is decreased. On the other hand, the photonic crystal using the block copolymer can also be used as three-dimensional resonator.

In the present invention a nonlinear optical material may be introduced in the side chains of a block copolymer or a polymer having a nonlinear optical effect may be used for the block copolymer. In such block copolymer, the nonlinear effect can be enhanced under the condition that the oscillator strength of light is raised by an impurity or the group velocity is lowered. Also, phase matching upon second harmonic generation can be realized by controlling the phase velocity. An element using a material having a third-order nonlinear optical effect can be used as an optical switch.

The optical functional element of the present invention can be used in various applications in promising optical circuits or optical systems in future, and can be a fundamental element corresponding to a resistor or capacitor in electronic circuits or electronic system.

EXAMPLES

Examples of the present invention will be described below with reference to the accompanying drawings.

Example 1

Figure 6:
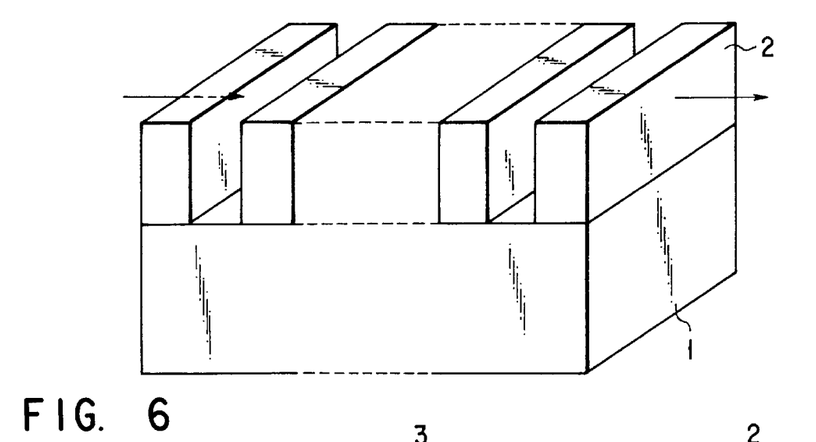
FIG. 6 is a perspective view of the optical delay element according to Example 1 of the present invention.

In this example, an optical functional element shown in FIG. 6 was manufactured by exposing a resist with an electron beam and developing it. A 100 μm thick glass substrate 1 was spin-coated with a resist 2 (available from Shipray Corp., tradename SAL601) to have a thickness of about 1.5 μm. The resist 2 on the glass substrate 1 was exposed by an electron beam to form 0.25 μm wide lines at 0.25 μm spacings, and thereafter, was developed. The resist 2 was patterned to form a waveguide type optical functional element which had a length of 300 μm in the longitudinal direction of the resist and a length of 7 cm along the widthwise direction of the resist. As shown in FIG. 6, this waveguide type optical functional element has a structure in which 0.25 μm thick resist portions 2 and 0.25 μm thick air portions are arranged at a period d=0.5 μm.

A Ti:sapphire laser beam having a pulse width of 100 femtoseconds was input from one end of this waveguide type optical functional element via a prism (not shown), and the transmitted light was measured at the other end (in FIG. 6, the incident light and transmitted light are respectively indicated by arrows). At this time, upon measuring the transmitted light while changing the wavelength of the incident light, a wavelength region where no transmitted light was observed was present on the higher energy (lower wavelength) side than the frequency of 370 THz (wavelength of 810 nm). The transmission time of light having a frequency of 333 THz (wavelength of 900 nm) was 350 psec ($350 \times 10^{-12}$ sec), and the transmission time of light having a frequency of 369.5 THz (wavelength of 812 nm) was 2.3 nsec ($2.3 \times 10^{-9}$ sec). It follows from the foregoing that light having the wavelength of 812 nm was delayed.

Example 2

Figure 7:
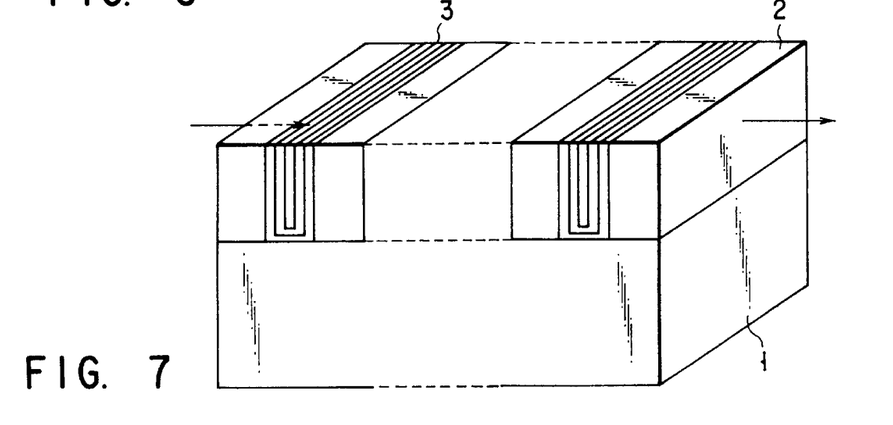
FIG. 7 is a perspective view of the optical delay element according to Example 2 of the present invention.

In this example, an optical functional element shown in FIG. 7 was manufactured. After a waveguide having an optical path length of 7 cm was formed following the same procedures as in Example 1, a gold film having a thickness about 1 nm and an $SiO_2$ film having a thickness of about 10 nm were alternately deposited on each groove portion between adjacent resist portions 2 to fill the groove portions. As shown in FIG. 7, this waveguide type optical functional element has a structure in which 0.25 μm thick resist portions 2 and 0.25 μm thick Au-glass multilayered film portions are arranged at a period d=0.5 μm.

As in Example 1, a Ti:sapphire laser beam having a pulse width of 100 femtoseconds was input from one end of this waveguide type optical functional element via a prism (not shown), and the transmitted light was measured at the other end. In this case, a wavelength region where no transmitted light was observed was present on the longer wavelength side than 1.04 μm. The transmission time of light having a wavelength of 1.03 μm was 5.2 nsec ($5.2 \times 10^{-9}$ sec), and the transmission time of light having a wavelength of 0.98 μm was 370 psec ($370 \times 10^{-12}$ sec). It follows from the above that light having the wavelength of 1.03 μm was delayed.

Example 3

Figure 8:
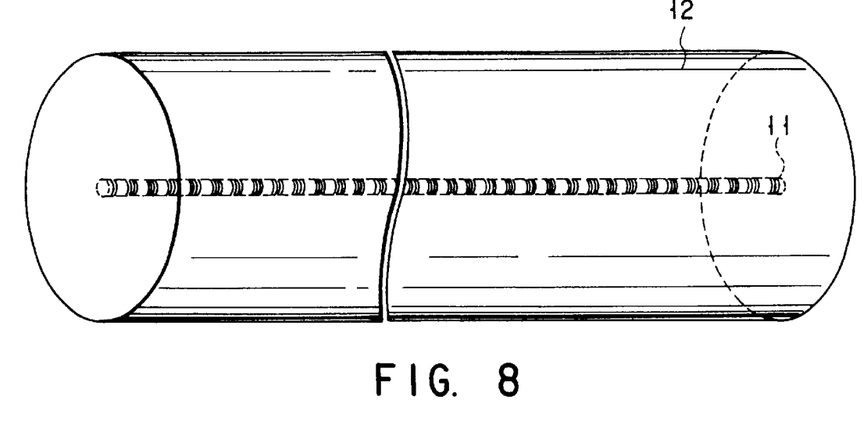
FIG. 8 is a perspective view of the optical delay element according to Example 3 of the present invention.

In this example, an optical functional element shown in FIG. 8 was manufactured. As shown in FIG. 8, a 2-m long single mode fiber having a core 11 having a diameter of 8 μm and a cladding 12 having a diameter of 200 μm was prepared. When light having a wavelength of 1,534 nm was input to this fiber, the transmission time was 10 nsec.

An excimer laser beam (a repetition of 50 pulses/sec, a power of 300 $mJ/cm^2$/pulse, a wavelength of 248 nm) was irradiated for 400 min by the phase mask photolithography method to expose a 5-mm long portion of the core 11 of the fiber to interference light, thereby forming a structure in which two materials having different refractive indices are periodically arranged at 5-mm intervals. Such structures were formed at 1-mm intervals to manufacture about 330 optical functional elements in the 2-m long fiber. When light having a wavelength of 1,534 nm was input to this fiber, the transmission time was 220 nsec, and it was confirmed that the light was delayed.

Example 4

Figure 9:
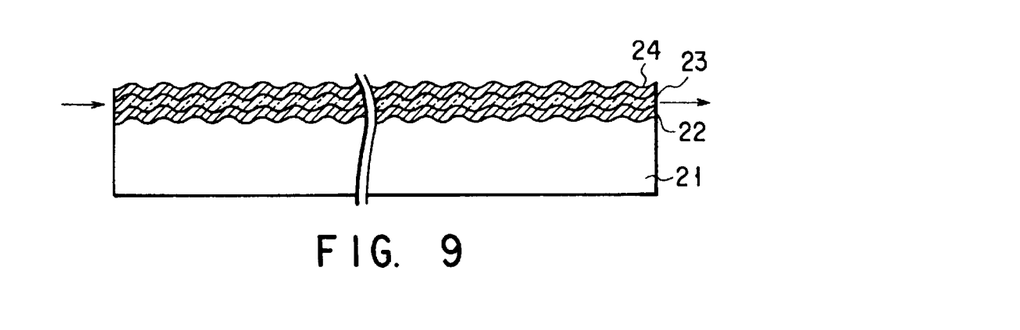
FIG. 9 is a perspective view of the wavelength converter according to Example 4 of the present invention.

In this example, an optical functional element shown in FIG. 9 was manufactured. A holographic diffraction grating 21 having 1,250 grating grooves per millimeter was prepared. A 200 nm thick silver film 22 was deposited on this holographic diffraction grating 21. The surface of the silver film 22 was spin-coated with a THF solution of 2-methyl-4-nitroaniline (MNA) as a nonlinear optical material and polymethyl methacrylate (PMMA), and thereafter, the solvent was evaporated to form a 4 µm thick optical functional film (MNA-doped PMMA film) 23. The refractive index of the film was unknown. A 200 nm thick silver film 24 was deposited on this optical functional film 23. An electric field of 0.3 MV/cm was applied to the optical functional film 23 for 30 min at 120° C. using the two silver films 22 and 24 as electrodes to perform poling, and thereafter, the structure was cooled to room temperature. Thereafter, in order to avoid orientation relaxation, an electric field of 50 kV/cm was kept applied to the optical functional film 23.

Figure 10:
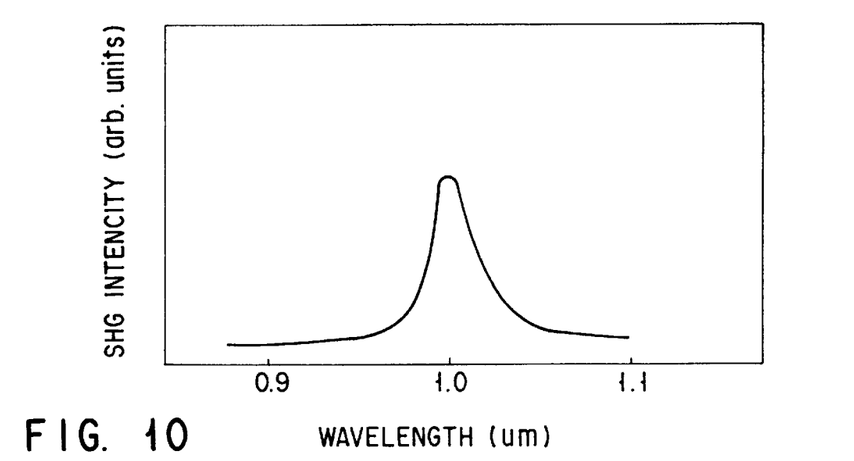
FIG. 10 is a graph showing the relationship between the wavelength of incident light and the intensity of the second harmonic measured by the wavelength converter according to Example 4 of the present invention.

Polarized light, the direction of the electric field vector of which is perpendicular to the grating grooves, was input from one end of the optical functional film 23 of this optical functional element, and the intensity of second harmonics output from the other end was measured. At this time, the wavelength of incident light was changed within the range from 0.9 to 1.1 µm. FIG. 10 shows the relationship between the wavelength of incident light and the intensity of the second harmonic. As can be seen from FIG. 10, phase matching is attained when the wavelength of the incident light (fundamental wave) is 1 µm.

Example 5

Figure 11:
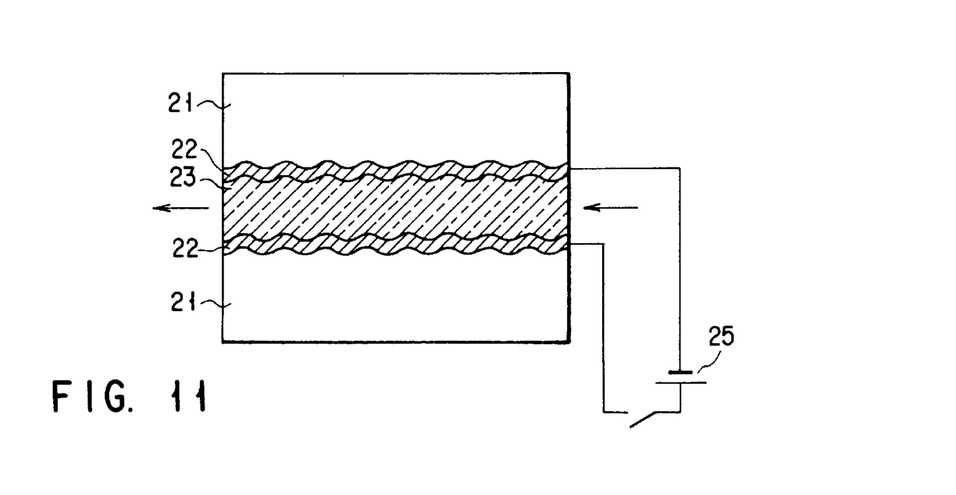
FIG. 11 is a sectional view showing the wavelength converter according to Example 5 of the present invention.

In this example, an optical functional element shown in FIG. 11 was manufactured. Two holographic diffraction gratings 21 were prepared. Each diffraction grating 21 had 1,800 grating grooves per millimeter, and an aluminum film 22 was deposited on its surface. A solution was prepared by dissolving 2-methyl-4-nitroaniline (MNA) and polymethyl methacrylate (PMMA) into THF to have a weight ratio 1:0.55. After the surface of one holographic diffraction grating was spin-coated with the solution, the solvent was evaporated to form a 5 µm thick optical functional film (MNA-doped PMMA film) 23. The other holographic diffraction grating 21 was arranged on the optical functional film 23 to oppose it. Subsequently, poling was done by applying a DC voltage of 30 V from a power supply 25 to the optical functional film 23 at 80° C. for 30 hours, and thereafter, the structure was cooled to room temperature.

Figure 12:
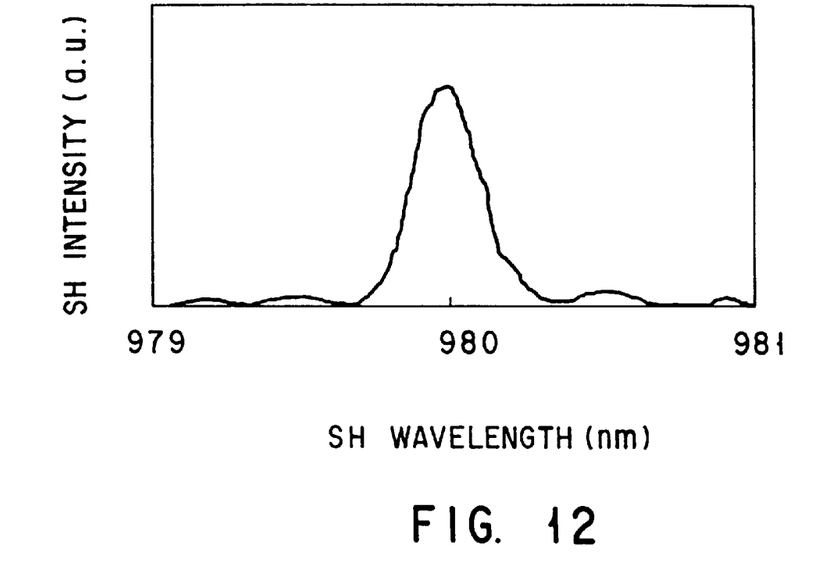
FIG. 12 is a graph showing the relationship between the wavelength and intensity of the second harmonic measured by the wavelength converter according to Example 5 of the present invention.

The refractive index of MNA/PMMA in this element is unknown. A variable wavelength laser was used, and a laser beam falling within the wavelength range from 800 nm to 2 µm was input, as the fundamental wave, from one end of the optical functional film 23 of this optical functional element. This incident laser beam is polarized light, the direction of the electric field vector of which is perpendicular to the grating grooves. In this manner, the intensity of the second harmonic output from the other end of the optical functional film 23 was measured. FIG. 12 shows the relationship between the wavelength and intensity of the second harmonic. As can be seen from FIG. 12, the SHG intensity becomes high at a wavelength of 980 nm, and the second harmonic is phase-matched with the fundamental wave (a wavelength of 1.96 µm).

Example 6

Figure 13:
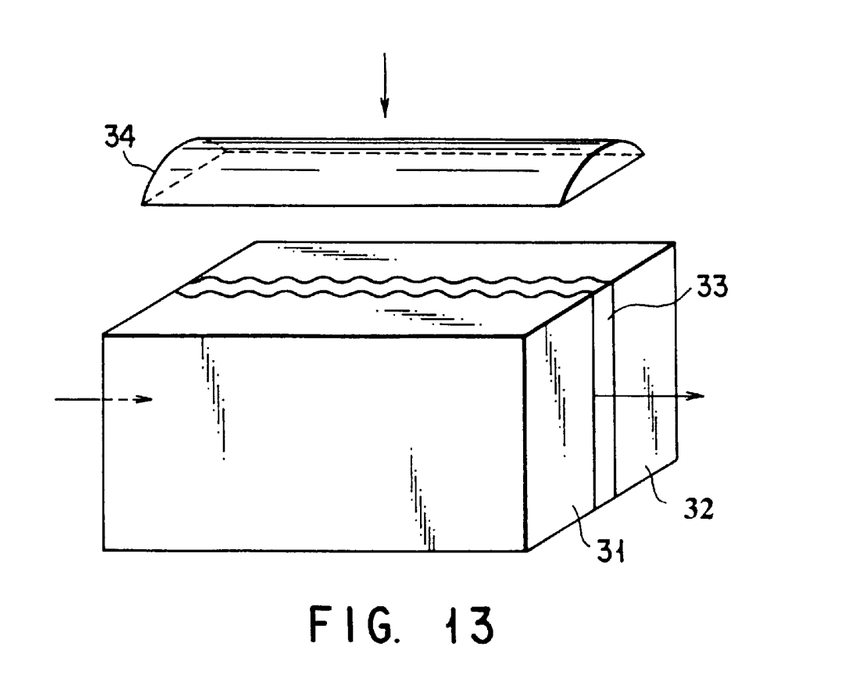
FIG. 13 is a perspective view of the optical amplifier according to Example 6 of the present invention.

In this example, an optical functional element shown in FIG. 13 was manufactured. Two holographic diffraction gratings with silver-coating (not shown) each having 3,600 grating grooves/mm were prepared. The surface of one holographic diffraction grating 31 was spin-coated with a THF solution of rhodamine 110 and PMMA, and thereafter, the solvent was evaporated to form a 3 µm thick optical functional film 33. The other holographic diffraction grating 32 was arranged on the film 33, so that the optical functional film 33 is interposed between the two diffraction gratings 31 and 32. A cylindrical lens 34 was arranged above the optical functional film 33.

For a comparison purpose, an element having the same structure as that of the above-mentioned element was manufactured using flat quartz glass substrates in place of the diffraction gratings.

A laser beam having a wavelength of 514.5 nm and power of 1 W was input from a CW argon ion laser (not shown) in a direction parallel to the grating grooves via the cylindrical lens 34. In this state, laser beam pulses (duration of about 1 psec) having a wavelength of 580 nm emitted by a dye laser excited by the second harmonic of a mode-locked YAG laser were input at a repetition of 82 MHz and a peak power of about 100 W from one end of the optical functional film 33 in a direction perpendicular to the grating grooves, and output light from the other end of the optical functional film 33 was measured. At this time, the peak power of the output light was 30 kW, and the amplification effect by the optical functional element was confirmed.

On the other hand, in the element using the flat quartz glass substrates, the peak power of the output light was 700 W, and the amplification effect was small.

Example 7

Following the same procedures as in Example 6, an optical functional element in which a 2 µm thick polydihexylsilane optical functional film was interposed between two silver-coated holographic diffraction gratings each having 3,600 grating grooves/mm was manufactured. This optical functional element is a prototype of an optical switch that uses the third-order nonlinear optical effect of polydihexylsilane.

For a comparison purpose, an element having the same structure as that of the above-mentioned element was manufactured using flat quartz glass substrates in place of the diffraction gratings.

For the two elements, three laser beams having a wavelength of 565 nm, power density of $2 \times 10^6$ W/cm$^2$, and a width of about 100 femtoseconds were used based on degenerate four-wave mixing to input signal light to the optical functional film, and the ratio of power of the signal light output from the optical functional film was measured. As a result, the signal light power of the element using the diffraction gratings was about 1,600 times that of the element using the flat quartz glass substrates. Upon converting such results into the third-order nonlinear susceptibility, the element using the diffraction gratings has a third-order nonlinear optical susceptibility about 40 times that of the element using the flat quartz glass substrates.

Example 8

The surface of a holographic diffraction grating having 3,600 grating grooves/mm was silver-coated, and a 3 µm thick PMMA film was formed thereon.

For a comparison purpose, the surface of a quartz glass substrate was silver-coated, and a 3 µm thick PMMA film was formed thereon.

For the two elements, a laser beam having a wavelength of 580 nm was input from a dye laser excited by the second harmonic of a mode-locked YAG laser to the PMMA film in a direction perpendicular to the grating grooves, and the transmitted light was measured. As a result, the transmission time of the element using the diffraction grating was 10 times that of the element using the flat quartz glass substrate for an identical optical path length.

Example 9

Two holographic diffraction gratings each having 2,900 grating grooves/mm were prepared. A 50 nm thick aluminum film was deposited on the surface of each diffraction grating. The surface of one holographic diffraction grating was spin-coated with a THF solution of polymethylphenylsilane, and thereafter, the solvent was evaporated to form a 0.6 μm thick polymethylphenylsilane thin film. The other holographic diffraction grating was arranged on this thin film to oppose it, thus manufacturing an optical functional element. In this element, the aluminum films on both surfaces of the polymethylphenylsilane thin film also serve as electrodes, and the polymethylphenylsilane functionals as a light-emitting material.

For a comparison purpose, an element having the same structure as that of the above-mentioned element was manufactured using flat quartz glass substrates in place of the diffraction gratings.

Light beams with various wavelengths were input from one end of the polymethylphenylsilane film, and the transmitted light beams output from the other end were measured. As a result, the element using the flat quartz glass substrate transmitted all the light beams. On the other hand, the element using the diffraction gratings did not transmit light falling within the wavelength range from 450 to 600 nm.

At −240° C., when a voltage of 11 V was applied across the aluminum electrodes, light emission from the interface was observed. At that time, in the element using the flat quartz glass substrates, a broad emission peak ranging from 460 to 620 nm ascribed to an impurity was observed in addition to a sharp emission peak near 350 nm. On the other hand, in the element using the diffraction gratings, an emission peak at 350 nm alone was observed in a shorter wavelength region than 600 nm. The emission amount at emission peak of 350 nm of the element using the diffraction gratings was about four times larger than that of the element using the flat quartz glass substrates.

Example 10

Two holographic diffraction gratings each having 1,800 grating grooves/mm were prepared. An aluminum film was deposited on the surface of each diffraction grating. Also, a solution was prepared by dissolving methyl(2,4-dinitrophenyl)amino-2-propanoate (MAP) into dioxane at a concentration of $1 \times 10^{-4}$ mol/L. The surface of one diffraction grating was spin-coated with the MAP solution, and the solvent was evaporated to form a 10 μm thick optical functional film. The other holographic diffraction grating was arranged on this optical function film to oppose it. The optical path length of this element was 1 cm.

Figure 14:
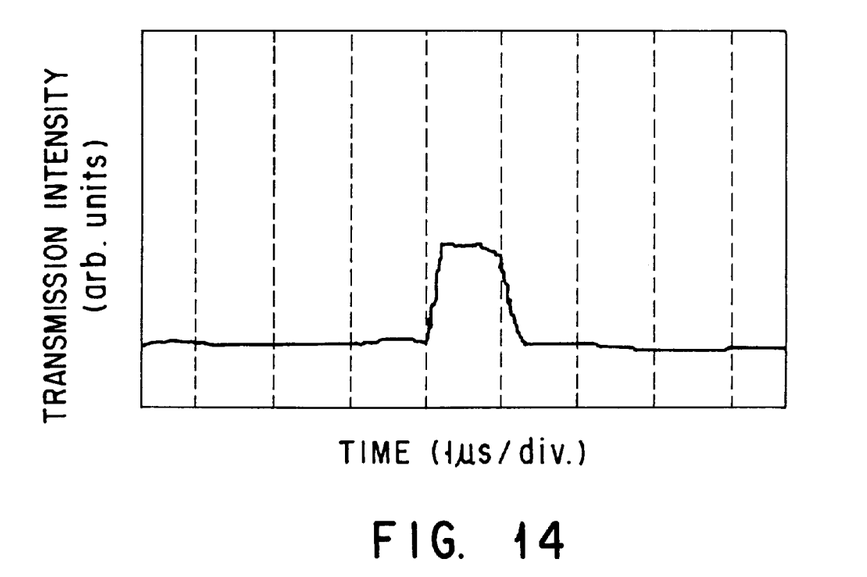
FIG. 14 is a graph showing the modulated signal obtained by the optical modulator according to Example 10 of the present invention.

A laser beam having a wavelength of 530 nm was input from a CW dye laser into this element, and a driving voltage having a pulse width of 1 μm and an electric field of 1 kV/mm was applied from the aluminum films on the diffraction gratings, thus measuring the transmitted light intensity. As a result, as shown in FIG. 14 the transmitted light was detected upon application of the driving voltage, thus modulation was attained.

Example 11

Figure 15:
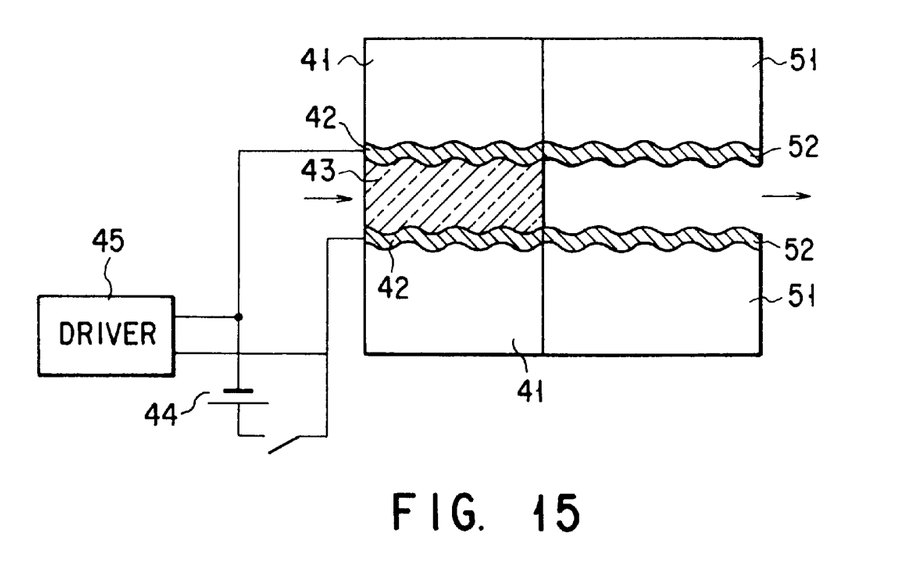
FIG. 15 is a sectional view of the optical modulator according to Example 11 of the present invention.

In this example, an optical functional element (optical modulator) shown in FIG. 15 was manufactured. Two holographic diffraction gratings 41 each having 1,800 grating grooves/mm were prepared. An aluminum film 42 was deposited on the surface of each diffraction grating. A solution was prepared by dissolving 2-methyl-4-nitroaniline (MNA) and polymethyl methacrylate (PMMA) into THF at 1:0.55 (weight ratio). After the surface of one holographic diffraction grating was spin-coated with the solution, the solvent was evaporated to form a 5 μm thick optical functional film 43. The other holographic diffraction grating 41 was arranged on this optical functional film 43 to oppose it. The optical path length of this element was 30 μm. This element was heated to 80° C., and a DC voltage of 80 V was applied from a DC power supply 44 via the aluminum films 42 for 30 hours, thus conducting poling. In addition, the two aluminum films 42 were connected to a driver 45 for changing the refractive index of the MNA/PMMA optical functional film 43 by applying AC voltage to the optical functional film 43. Two opposing holographic diffraction gratings 51, each of which had 1920 grating grooves/mm and on the surface of each of which an aluminum film 52 was deposited, were arranged at the output side of this optical modulator. These holographic diffraction gratings 51 serve as an optical delay element that delays the group velocity of light after the light is output from the optical modulator.

A laser beam having a wavelength of 530 nm was input from a CW dye laser to the optical modulator and the optical delay element. This incident light is polarized light, the direction of the electric field vector of which is perpendicular to the grating grooves. Inside the optical modulator and the optical delay element, the group velocity of the light becomes about ⅛ that of the light velocity in vacuum. The refractive index of the optical functional film 43 was changed by applying, from the driver 45, an AC voltage having a peak voltage of 300 V and a frequency of 240 MHz via the two aluminum films 42, so as to attain AM modulation. When modulated light is picked up from the space between the gratings 51, 52, the frequency of the output light was 1.7 GHz. In this manner, the group velocity of light is delayed inside the elements, and is restored when the light leaves the elements.

Example 12

As monomers constituting a block copolymer, styrene and isoprene described by chemical formulas below were used.

[chemical formulas 1]

The styrene and isoprene were subjected to sequential living anionic polymerization in tetrahydrofuran using sec-butyl lithium as an initiator. As a result, a block copolymer consisting of a polystyrene chain having a molecular weight of $34 \times 10^4$ and a polyisoprene chain having a molecular weight of $18 \times 10^4$ was obtained. The obtained block copolymer was dissolved in a solvent, and the solution was cast onto a substrate to form a thin film. Upon observing the thin film using an electron microscope, the thin film had a diamond structure having a lattice constant of about 200 nm. This thin film will be referred to as a copolymer film A hereinafter.

On the other hand, the sequential living anionic polymerization as above was used except that the monomer ratio was altered from the above method, and a block copolymer consisting of a polystyrene chain having a molecular weight of 470,000 and a polyisoprene chain having a molecular weight of 110,000 was synthesized. As in the copolymer film A, the obtained block copolymer was dissolved in a solvent, and the solution was cast onto a substrate to form a thin film. Upon observing this thin film using an electron microscope, the thin film had a face-centered cubic (FCC) structure having a lattice constant of about 200 nm. This thin film will be referred to as a copolymer film B hereinafter.

Figure 16:
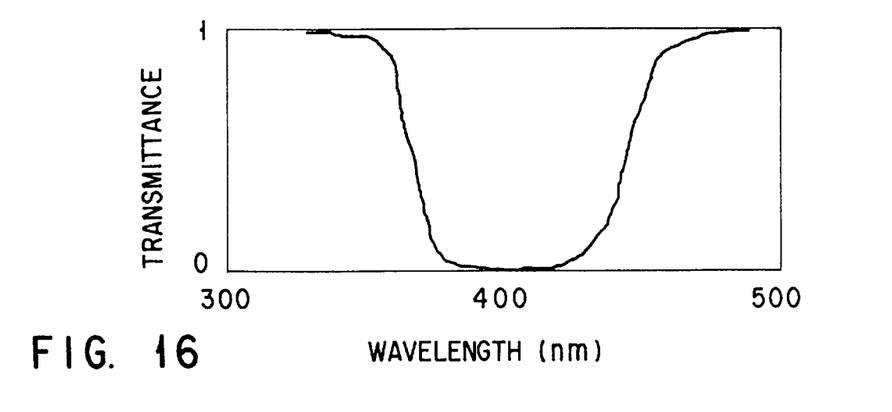
FIG. 16 is a graph showing the transmission spectrum of the copolymer film A in Example 12 of the present invention.

The transmission spectra of the copolymer films A and B were measured. FIG. 16 shows the transmission spectrum of the copolymer film A. As can be seen from FIG. 16, the copolymer film A does not transmit light in the wavelength region near 400 nm, and a photonic band gap is formed. Although not shown, no photonic band gap was formed in the copolymer film B. These results are concordant with the common knowledge that a photonic band gap hardly appears in the FCC structure, but easily appears in the diamond structure with low symmetry.

Example 13

As in Example 12, a block copolymer of a laser dye monomer described by the following chemical formula and isoprene was synthesized by sequential living anionic polymerization.

[chemical formula 2]

Figure 17:
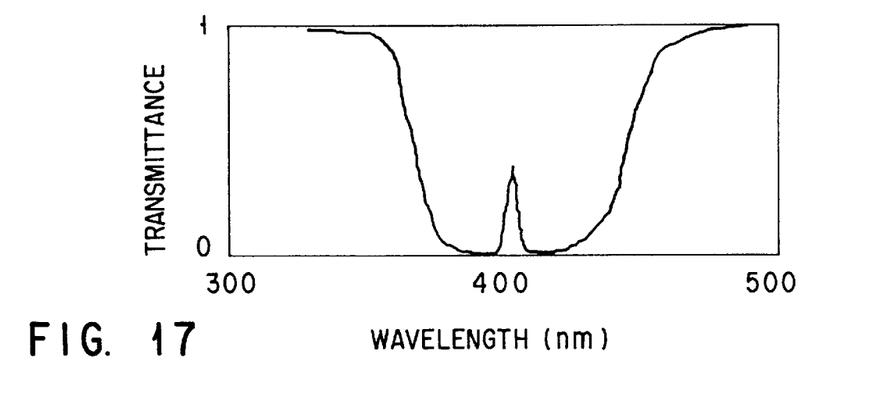
FIG. 17 is a graph showing the transmission spectrum of the copolymer film C in Example 13 of the present invention.

The obtained block copolymer was dissolved in a solvent, and crosslinking modified polyisoprene spheres which had a diameter of about 100 nm and were insoluble in the solvent were mixed. This solution was cast onto a substrate to form a thin film. This thin film will be referred to as a copolymer film C. The polyisoprene spheres serve as an impurity that disturbs periodical changes in refractive index in the phase-separated block copolymer. FIG. 17 shows the transmission spectrum of the copolymer film C. As shown in FIG. 17, a wavelength region of light that can be transmitted through the thin film appears at the central portion of the photonic band gap.

Figure 18:
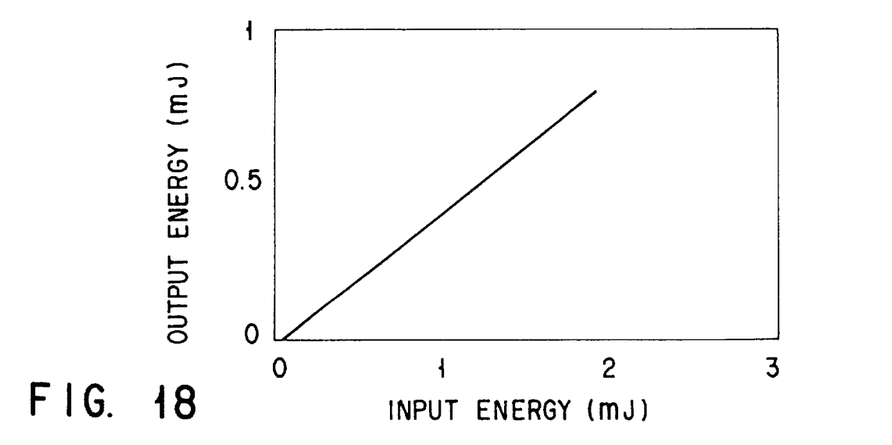
FIG. 18 is a graph showing the relationship between the input and output energies of the copolymer film C in Example 13 of the present invention.

A laser beam having a wavelength of 337 nm, a repetition of 10 Hz, and a duration of 10 nsec was irradiated from a nitrogen laser onto the copolymer film C, and the average power was gradually raised to measure the output energy. FIG. 18 shows the relationship between the input and output energies at that time. As shown in FIG. 18, when the input energy exceeds a threshold value, the output energy becomes larger in proportion to the input energy. It follows from this fact that laser oscillation has occurred.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An optical functional element comprising:

a structure having materials with different refractive indices and periodically arranged to form a photonic band folded onto a first Brillouin zone edge defining a Brillouin zone edge wavelength, wherein a difference between a wavelength of a light to be transmitted and the Brillouin zone edge wavelength falls within 15% of the Brillouin zone edge wavelength, wherein the transmitted light wavelength stays within the photonic band, and wherein the structure comprises patterned resist lines and air.

2. An optical functional element comprising:

a structure having materials with different refractive indices and periodically arranged to form a photonic band folded onto a first Brillouin zone edge defining a Brillouin zone edge wavelength, wherein the structure comprises patterned resist lines and an inorganic material buried between adjacent resist lines; and wherein the Brillouin zone edge wavelength is set in a vicinity of a wavelength of light to be transmitted.

3. The element according to claim 2, further comprising an ultrasonic generator configured to change a periodicity of the materials with different refractive indices.

4. The element according to claim 2, further comprising a temperature regulator configured to change periodicity of the materials with different refractive indices.

5. An optical functional element comprising:

a structure having materials with different refractive indices and periodically arranged to form a photonic band folded onto a first Brillouin zone edge defining a Brillouin zone edge wavelength, wherein a difference between a wavelength of a light to be transmitted and the Brillouin zone edge wavelength falls within 15% of the Brillouin zone edge wavelength, wherein the transmitted light wavelength stays within the photonic band, and wherein the structure comprises a periodically exposed core of an optical fiber.

6. An optical functional element comprising:

a structure having materials with different refractive indices and periodically arranged to form a photonic band folded onto a first Brillouin zone edge defining a Brillouin zone edge wavelength, wherein a difference between a wavelength of a light to be transmitted and the Brillouin zone edge wavelength falls within 15% of the Brillouin zone edge wavelength, wherein the transmitted light wavelength stays within the photonic band, and wherein the structure comprises a diffraction grating.

7. An optical functional element comprising:

a structure having materials with different refractive indices and periodically arranged to form a photonic band folded onto a first Brillouin zone edge defining a Brillouin zone edge wavelength, wherein a difference between a wavelength of a light to be transmitted and the Brillouin zone edge wavelength falls within 15% of the Brillouin zone edge wavelength, wherein the transmitted light wavelength stays within the photonic band, and wherein the structure comprises a block copolymer having a regular phase separation structure.

8. An optical functional element comprising a structure having materials with different refractive indices and periodically arranged to form a photonic band folded onto a first Brillouin zone edge, wherein said structure comprises:

a diffraction grating configured to form the photonic band, and an optical functional film formed on a surface of said diffraction grating.

9. An optical functional element comprising a structure having materials with different refractive indices and periodically arranged to form a photonic band folded onto a first Brillouin zone edge, wherein said structure comprises:
a diffraction grating configured to form the photonic band,
a first metal film formed on said diffraction grating;
an optical functional film formed on said first metal film; and
a second metal film formed on said optical functional film.

10. An optical functional element comprising:

two diffraction gratings having metal films formed thereon, said diffraction gratings being arranged to oppose each other and to form a photonic band folded onto a first Brillouin zone edge; and an optical functional film interposed between the two diffraction gratings.

11. The element according to claim 10, wherein said optical functional film comprises a polymer including an optical functional material dispersed therein.

12. The element according to claim 11, wherein the optical functional material comprises a second-order nonlinear optical material.

13. The element according to claim 11, wherein the optical functional material comprises a third-order nonlinear optical material.

14. The element according to claim 11, wherein the optical functional material comprises a light-emitting material.

15. An optical functional element comprising:

two diffraction gratings arranged to oppose each other, having metal films formed on surfaces thereof, and configured to form a photonic band folded onto a first Brillouin zone edge;

an electro-optic material interposed between said two diffraction gratings; and a driver connected to the metal films and adapted to apply a voltage to change a refractive index of said electro-optic material.

16. An optical functional element comprising:

a diffraction grating having a metal film formed thereon;

a metal body; and an optical functional film interposed between the diffraction grating and the metal body;

wherein the diffraction grating and the metal body are arranged to oppose each other and to form a photonic band folded onto a first Brillouin zone edge.

17. The element according to claim 16, wherein said optical functional film comprises a polymer including an optical functional material dispersed therein.

18. The element according to claim 17, wherein said optical functional material comprises a second-order nonlinear optical material.

19. The element according to claim 17, wherein said optical functional material comprises a third-order nonlinear optical material.

20. The element according to claim 17, wherein said optical functional material comprises a light-emitting material.

* * * * *